United States Patent [19]
Baldwin

[11] 3,805,883
[45] Apr. 23, 1974

[54] PROBE FOR GYROMAGNETIC RESONANCE SPECTROSCOPY

[75] Inventor: David Michael Baldwin, Flackwell Heath, England

[73] Assignee: Perkin-Elmer Limited, Buckinghamshire, England

[22] Filed: Aug. 2, 1971

[21] Appl. No.: 168,287

[52] U.S. Cl............................... 165/26, 165/30
[51] Int. Cl............................. F25b 29/00
[58] Field of Search............ 165/26, 27, 30, 141, 66

[56] References Cited
UNITED STATES PATENTS
3,371,145  2/1968  Camille, Jr................... 165/141
3,273,356  9/1966  Hoffman....................... 165/65

Primary Examiner—Charles Sukalo
Attorney, Agent, or Firm—Daniel R. Levinson

[57] ABSTRACT

A sample probe for gyromagnetic (particularly nuclear magnetic) resonance spectroscopy in which the sample may be brought to a desired controlled temperature includes: inner sleeve members defining a forward path for a temperature controlled working gas, which successively passes through a cooler, over the coil of a servo-controlled heater and then to the sample station; apertures in the downstream end of the inner sleeve members causing the gas to reverse its flow back between the inner sleeve members and outer tubular means, the return gas substantially passing around the sample station and heating means, and in direct heat-exchanging relationship to the cooler. This return path of the gas tends to minimize temperature gradients in the vicinity of the sample, while the heat exchange at the cooler tends to minimize the cooling of the incoming gas at high controlled (heater) temperatures; thus the heat within the system is conserved, all described parts being surrounded by an insulating Dewar tube.

12 Claims, 4 Drawing Figures

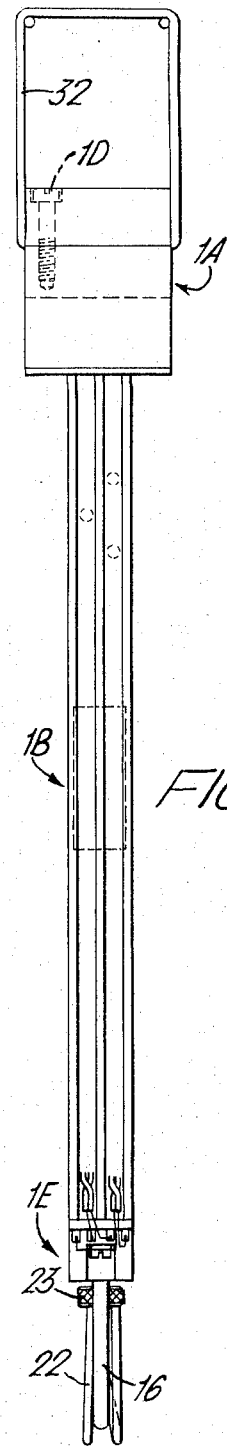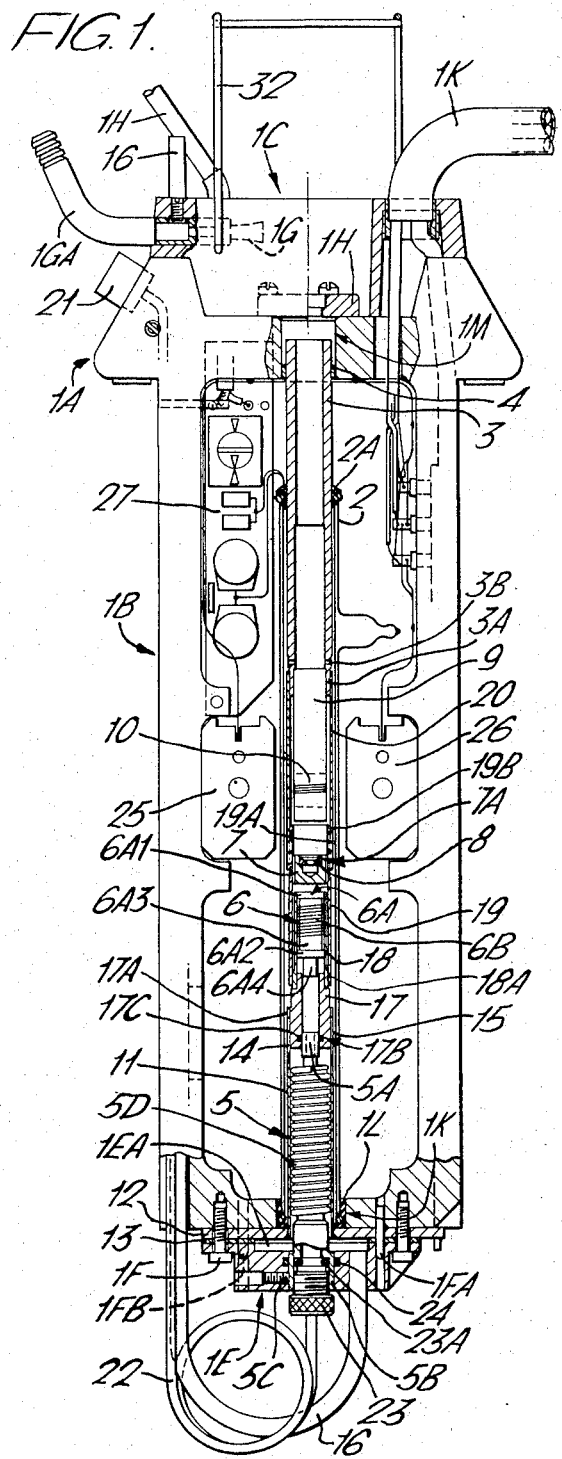

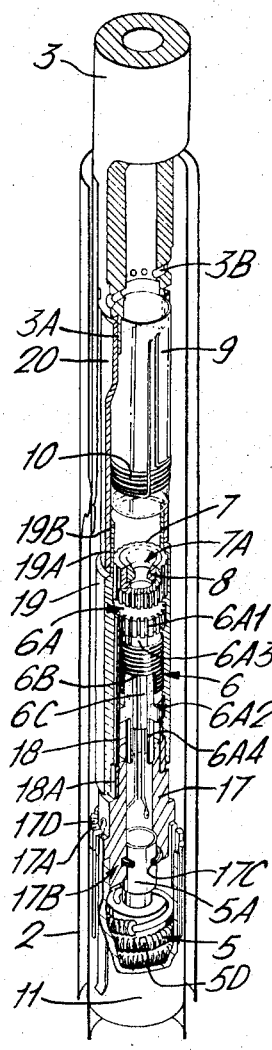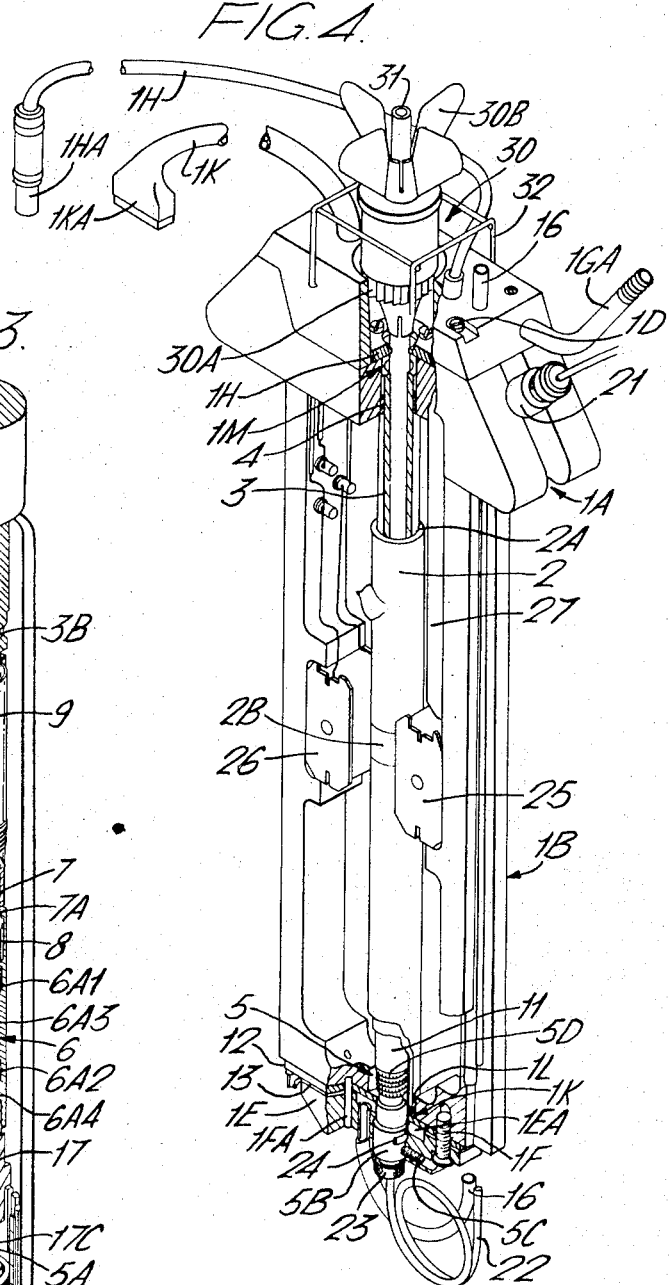

PROBE FOR GYROMAGNETIC RESONANCE SPECTROSCOPY

This invention relates to temperature controlled probes for Gyromagnetic Resonance Spectroscopy, with particular regard to Nuclear Magnetic Resonance (NMR) Spectroscopy.

There are very well known analytical reasons for observing the gyromagnetic resonance spectrum of a sample at different temperatures in turn, within a predetermined range. This naturally means that the sample must be heated or cooled while it is accommodated in a sample holder inside a probe immersed in a polarizing magnetic field. Whatever control system is employed, it must be capable of acting on the sample through its holder without at the same time introducing thermal disturbances capable of significantly affecting the resoltuion and the stability of the polarizing field.

According to the present invention there is provided a variable temperature probe for gyromagnetic resonance spectroscopy, comprising: a Joule-Thomson minicooler device, a heating coil, a sample station and intercommunicating gas passages, the whole being so constituted and arranged that when in operation a suitable temperature control gas is forced at comparatively high pressure through the minicooler it will upon emerging therefrom impinge upon the heater, flow through the sample station in one direction, and then reverse its flow into an annular passage surrounding both the sample station and the heater, before finally impinging upon the cooling coils of the minicooler.

In the arrangement outlined above, a gas such as nitrogen or argon may be used as the temperature control gas, hereinafter called working gas, in the dual role of a cooling gas in accordance with the Joule-Thomson effect and as a heat transfer medium between the heater and the sample station. In order to provide for both cooling and heating of the sample within a predetermined range, it may be arranged for the exit temperature of the working gas at the nozzle of the minicooler to be lower than that marking the low end of said range and for the heater to supply enough heat for said low end to be reached. To attain the upper end of the range, it would merely be a question of increasing the thermal dissipation of the heater.

Our above proposal may be contrasted with the obvious solution of having one gas stream for the minicooler, with conventional forward and reverse flow, and one for heat transfer purposes, traversing the probe from end to end in a single direction. This solution would be inefficient in terms of the heater dissipation required to cover a given temperature range and would aggravate therefore the thermal disturbance of the polarizing magnetic field. Our arrangement is a significant improvement: by extending the gas path of the minicooler to include the heater and the sample station in the forward direction and an annular space around the sample station and the heater in the reverse direction, not only is the heat conserved within the system so as to act on the minicooler in a manner tending to narrow the temperature excursions at the sample station, but the inevitable temperature gradient set up by the gas flowing through the heater and the sample station in one direction is to a large extent cancelled by the gas flowing in the opposite direction through the annular space around sample station and heater.

In order to enable the temperature at the sample station to be controlled in servo-loop manner, we may arrange a temperature sensor within the probe in good thermal contact with the heater. This again contrasts with some known arrangements in temperature controlled probes for NMR use wherein the sensor is placed in the heat-transferring gas stream and is separated from the heater by a path of high thermal impedance, so high in fact that if the gas supply is accidentally interrupted the heater will burn out, unless external fail-safe provisions are included in the system.

In our case the heat path between heater and sensor is of such a low impedance that the sensor reacts with a very small time lapse to a sudden increase in the dissipation of the heater. Consequently, even if the gas flow is completely cut off, the servo-loop will maintain a heater temperature not very far removed from that existing when the gas was inpinging upon it.

A Variable Temperature Probe (VTP) for NMR Spectroscopy representing an embodiment of the present invention will now be described with reference to the accompanying diagrammatic drawings, wherein:

FIG. 1 is a partly cross-sectional front elevation of the VTP;

FIG. 2 is a side elevation of the VTP shown in FIG. 1;

FIG. 3 is an enlarged perspective view, with cutaways, of a tubular assembly extending lengthwise through the VTP shown in FIG. 1;

FIG. 4 is a perspective view of the VTP depicted in FIG. 1, with cut-aways at the top and bottom, respectively.

In the description that follows, reference shall first be made to FIG. 1 unless it is stated otherwise, the perspective views of FIG. 3 and FIG. 4 being mainly intended to facilitate the interpretation of FIG. 1. Like references have naturally been used for like parts in all figures.

As shown in FIG. 1, the VTP comprises an aluminum body machined from solid having a head part 1A and a depending part forming a generally rectangular frame 1B, within which electrical and mechanical components are accommodated.

A nylon block 1C is secured to the head part 1A by screws such as 1D (FIGS. 2 and 4) and a copper manifold block 1E is secured to the bottom limb of the frame 1B by screws such as 1F, after being located by two dowels 1FA and 1FB. The main function of the nylon block 1C is to provide a well into which a turbine 30A (FIG. 4), which together with stabilizer vanes 30B forms part of a nylon turbine assembly 30 having an axial bore frictionally engaging the upper part of sample-holder tube 31, may be spun when compressed gas is made to impinge thereon from nozzle 1G (FIG. 1) fed from stub pipe 1GA. In addition, block 1C supports a loaded polytetrafluoroethylene top bearing 1H for spinning the sample holder in co-operation with a bottom bearing presently to be described. Sample spinning is such a well-known NMR technique that we will not dwell on details other than those peculiar to our construction.

The VTP of FIG. 1 is specifically intended for an NMR spectrometer in which the polarizing field is provided by a permanent magnet having a working gap of a given length and the thickness of the frame 1B, as shown in the side elevation of FIG. 2, is chosen to fit that gap. Although there is no reason why the longitudinal axis of the VTP (hereinafter referred to as the VTP axis) should be oriented in any particular radial direction around the magnetic axis of the polarizing field as long as it crosses the field at right angles thereto, we will assume for the purpose of simplifying the present description that the VTP is intended for a magnet system in which the VTP axis is roughly vertical, with the head part 1A uppermost, of course.

A Dewar 2 (in truth only a partial Dewar because the bottom is missing) the longitudinal axis of which substantially coincides with that of the VTP is located at its lower end in a centre bore 1K provided through the bottom limb of frame 1B and is sealed to the bore by silicon rubber 1L. At its upper end, Dewar 2 is held by tufnol sleeve 3, which fits into a centre bore 1M in head part 1A and makes contact therewith through an intervening brass ring 4, the function of which is to facilitate assembly by allowing a certain amount of tilt in sliding the tufnol sleeve 3 into the bore 1M. The Dewar 2 is made fast to the tufnol sleeve 3 by a sealant, such as silicon rubber, indicated at 2A.

There is thus defined a thermally insulating cylindrical enclosure extending right through the VTP. Within this enclosure, from the bottom upward, we arrange in axially spaced relation a Joule-Thomson minicooler 5, a heating and sensing unit 6, a plug 7 for supporting a sample-spinning bottom bearing 8, and a cylindrical glass former 9 having wound thereon a receiver coil 10 and fitting into the bottom end of tufnol sleeve 3. The Dewar 2 is provided with an unmetallized cylindrical portion 2B (FIG. 4) in correspondence of the receiver coil 10 that acts as a "window" through which the RF energy for irradiating the NMR sample finds an unobstructed path. To minimize eddy current losses, the metallizing is longitudinally slit in two places, with the result that pairs of half-cylindrical identical layers are defined above and below said "window", respectively.

The minicooler is surrounded by a fibreglass sleeve 11 jointed T-fashion to a rectangular flange 12 clamped between copper manifold block 1E and bottom limb of frame 1B through intervening seal 13. Longitudinal slits such as indicated in cross-section at 14 and 15 are provided at the top of fibreglass sleeve 11 for the purpose of allowing the returning working gas to enter sleeve 11, spiral around the coils 5D of the minicooler 5, reach the well 1EA in block 1E and finally exhaust to atmosphere through pipe 16.

A stepped bridging sleeve 17 of a suitable material having low thermal conductivity and adequate stability between, say, −100° and + 150° centigrade, fits at one end into sleeve 11 as far as shoulder 17A will allow and at the other end into a copper sheath 18, slits such as 14 and 15 registering with corresponding slits in shoulder 17A shown at 17D in FIG. 3. An internal groove 17B accommodates an O-ring 17C sealing the bore of the bridging sleeve 17 and the outer surface of nozzle 5A of minicooler 5.

Sheath 18 fits snugly over cheeks 6A1 and 6A2 of copper bobbin 6A forming part of unit 6. Cheeks 6A1 and 6A2 are provided with longitudinal circumferentially spaced grooves forming gas passages. A small step exists between each of the cheeks and the cylindrical body 6A3 extending therebetween, on which body a heater coil 6B is wound. An air gap is thus allowed between the outer surface of the coil 6B and the inner surface of sheath 18. The copper bobbin 6A is provided with a small cylindrical extension 6A4 which fits loosely into the upper bore of bridging sleeve 17 so as to define an annular gas passage between bore and extension. A platinum temperature sensor 6C (FIG. 3) is inserted into an axial bore in bobbin 6A in good thermal contact therewith, the bore being sealed at both ends so that no gas can flow over the sensor.

Fiberglass sleeve 11, bridging sleeve 17 and copper sheath 18, with bobbin 6A within it form a coaxial cylindrical unit in which the parts are held together in frictional engagement and in addition are made fast by the use of an epoxy resin such as Araldite.

The copper sheath 18 is stepped at 18A and over this step fits the inner bore of an outer copper sleeve 19 reduced in diameter at 19A and restored to the original diameter at ridge 19B. The plug 7 is a press fit in the bore of outer copper sleeve 19 and is provided with longitudinal circumferentially spaced grooves forming gas passages. The sample-spinning bottom bearing 8 is a tight fit in a recess 7A.

An outer glass sleeve 20 is slipped over the ridge 19B at one end and over the reduced extremity 3A of tufnol sleeve 3 at the other end.

In operation, a working gas is admitted at substantially constant pressure through inlet connection 21 in head part 1A and inlet tube 22 (see both FIG. 1 and FIG. 2) running along one side of frame 1B and connecting with the minicooler 5 through a plug connector 23 screwed into cylindrical body 5B of minicooler 5 and end sealed by O-ring 23A, said body being made a sliding fit into a receiving bore in copper manifold block 1E and O-ring 24 providing a gas-tight seal between said bore and the body. Grub screw 5C secures the body 5B to said bore. The working gas flows axially through the minicooler 5, escapes from a small orifice in nozzle 5A, enters the bridging sleeve 17, passes through the annular gap around extension 6A4, through the grooves in cheek 6A2, over th heater coil 6B, through the grooves in cheek 6A1, through the grooves in plug 7, and through the former 9.

At this juncture we must imagine a cylindrical sample holder in position within the probe, laterally restrained by top bearing 1H and axially supported by a pivoting pip at its bottom end fitting into bottom bearing 8. A very small clearance (for example 0.003 inch on diameter) is allowed between the wall of the sample holder and approximately the top half of the bore in tufnol sleeve 3, whereas the bottom half of the bore is relieved sufficiently to guard against the risk of the spinning sample holder fouling the tufnol sleeve 3, a risk which becomes naturally greater as we move downward from top bearing 1H.

The small clearance at the top of the tufnol sleeve 3 means that the working gas having reached the top of the glass former 9 will find an easier path through the orifices 3B in tufnol sleeve 3 and will proceed downwards in an annular passage the outer boundary of which is defined by the inner face of the Dewar 2 and the inner boundary of which is defined by the outer face of glass sleeve 20, outer copper sleeve 19, bridging sleeve 17 and the top of fibreglass sleeve 11, the gas then passing through slits 14 and 15 as previously explained.

In the VTP as described above the sample station is a volume within glass former 9 extending well above and below the receive coil 10. It is clear that as the working gas rises through the sample station the sample will experience a temperature gradient which affects its magnetic susceptibility and consequently impairs resolution in the observed spectrum. By causing the gas flow to reverse after it has well passed the sample station and guiding it into an annular space around the sample station, the gradient caused in the sample by the returning gas tends to cancel that set up by the gas in its forward flow. As a contributory feature towards minimizing the temperature gradient we have located the top of the Dewar well away from the orifices 3B and we suspect that the relieved bottom half of the bore in tufnol sleeve 3 may also play a part in levelling off the gradient.

Turning now to the heating and sensing unit 6, it is easy to appreciate that since both the heater coil 6B and the platinum temperature sensor 6C (FIG. 4) are in very good thermal contact with the solid copper bobbin 6A a very low thermal impedance path exists therebetween and that even if the working gas supply should fail the servo-loop system through which heater and sensor are operatively linked would prevent the heater from burning out. This is naturally a valuable feature as far as the user is concerned and is far more satisfactory than other forms of fail-safe provisions, in so far as it is effective as long as the servo-loop which regulates the VTP temperature is functioning correctly and a malfunction of the loop would be easily detected by the user in the normal operation of the probe.

It may at first appear that in attributing to the working gas the dual role of cooling gas and heat transfer medium the first role becomes anomalous when the sample heating mode is operative. This is not strictly so because the Joule-Thomson effect is present regardless of the temperature setting. However, when heating is demanded through the servo-loop, i.e., when the temperature of the sample is to be raised well above ambient, although the temperature of the incoming working gas drops as it expands through the nozzle 5A, this cooling effect is swamped by the heat picked up by the gas in passing over the heater, with the result that the return gas will actually give up heat to the coils of the minicooler, and tend to heat up the incoming gas upstream of the nozzle. At the higher temperature settings of the servo-loop, the temperature of the gas approaching the nozzle nearly equals that of the returning gas, the coils of the minicooler thus functioning as an efficient heat exchanger to minimize the heat transfer to atmosphere in maintaining a desired sample heating temperature at the sample sation.

In order to minimize the effect upon the NMR sample of downward temperature gradients from the uncontrolled region above orifices 3B (see FIG. 3 in particular), we arrange for the length of the sample column to be shorter than the total length of the controlled zone extending approximately from the vicinity of bottom bearing 8 to the orifices 3B. A good compromise is to make the column some 3cm long and allow for about 1cm between the free surface of the column and the orifices 3B.

FIG. 1 shows a number of parts such as the field modulation coils 25 and 26 and the components generally indicated at 27 forming part of the receiver coil bridge. There is no need to describe them in detail since they are not directly concerned with the invention and follow common practice in NMR probe construction.

By the same token, details such as the manner in which connections are made with the heater and the sensor through strip conductors running along fibreglass sleeve 11 and flange 12 have been omitted, since these are merely incidental to the main features of the construction shown. Lead 1H, provided with plug 1HA (FIG. 4) is used for feeding in, via the bridge circuit 27, the RF power required for the irradiation of the NMR sample and for picking up the NMR resonance signal from the said bridge circuit. Lead 1K, provided with plug 1KA, supplies the field modulation coils 25 and 26 with audio-frequency power and the heater coil 6B with AC heating power; in addition, it enables the signal from the sensor 6C (FIG. 4) to be extended to the external circuits of the servo-loop controlling said heating power.

The VTP illustrated in FIG. 1 is intended for use within a temperature range extending from −100° to +150° degrees centigrade. The user may grasp it by the rail 32 and slide it into and out of the working gap of a polarizing magnet provided with suitably arranged guideways.

We used substantially constant working-gas pressures of 1,400 p.s.i. between +40° and −100° centigrade and 800 p.s.i. between +40 and +150 degrees centigrade. We chose argon between −50 and −100 and nitrogen for the remainder of the temperature range.

In contrast with certain prior art probes, the sample-spinning top bearing in the embodiment of FIG. 1 gave us no icing up troubles, even when the lowest temperatures were maintained day after day. The problem can be quite serious in prior art VTP's and in extreme cases complete seize up of the tube is not unknown. We believe that limiting the temperature-controlled zone to a comparatively small volume and reversing the direction of flow of the working gas well below the top bearing, by some 6cm ensures that the temperature at the sample station has little effect on the bearing. A contributory factor to this highly desirable result is perhaps the location of the upper end of Dewar 2, significantly above the orifices 3B, by some 3cm.

By preventing the top bearing from experiencing wide temperature changes as the setting of the VTP is altered, we are able to maintain a very close clearance between the spinning sample-holder tube and the co-operating inner surfaces of the top bearing throughout the VTP range, without risking mechanical seizure due to contraction of the bearing at low temperature.

The avoidance of fine pressure adjustments to obtain a desired sample temperature, as required in some prior art probes in which liquid nitrogen is used for controlling the lower temperatures, is a great convenience to the operator, especially as such adjustments are usually carried out in the open-loop mode as distinct from the automatic action of our servo-loop controlling the heating means through the temperature sensor.

By providing a very close thermal coupling between the heater and the temperature sensor and placing the heater just upstream of the sample station, we ensure that with a servo-loop of adequate gain the time constant of the temperature regulating system is particularly short. This enables the set temperature to be approximated very closely in a comparatively short time without requiring any manipulation from the user other than the setting of a dial.

The term "minicooler" as used in the present specification is intended to refer to a miniature cooling device based on the Joule-Thomson effect. A minicooler suitable for the realization of the embodiment hereinbefore described with reference to FIGS. 1 to 4 may be obtained under the code MAC 108 031 from the Hymatic Engineering Company Limited, of Glover Street, Redditch, Worcestershire, England.

What we claim is:

1. A variable temperature probe for gyromagnetic resonance spectroscopy, comprising:
a Joule-Thomson minicooler device in which there are provided a passage forming part of a forward path of a temperature-controlling working gas, a heat exchanger means about said passage forming part of a return path of said working gas and a nozzle at the downstream end of said passage;
heating means downstream of and spaced from said nozzle;
a cylindrical member downstream of said heating means for defining the longitudinal boundary of a temperature-controlled sample station whereat a sample may be accommodated within a sample-holder tube;
means defining said forward path for the working gas as it diffuses through the nozzle, impinges on the heating means and reaches said sample station;
means towards the downstream end of said sample station for reversing the flow of the working gas into said return path;
and means for defining said return path around the forward path.

2. The probe of claim 1, in which said heating means comprises:
an electrical heating device, an electrical temperature sensor in contact with said heating device, and connecting means for connecting said heating device and said sensor to an electrical control circuit external to the probe.

3. The probe of claim 2, wherein:
said heating device comprises a coil of wire wound on the outside of a bobbin of good thermal conductivity;
and said temperature sensor is sealed into, and in good contact with, an axial bore in said bobbin.

4. The probe of claim 1, wherein the portion of the forward path extending between said nozzle and said heating means is defined by a material having a low thermal conductivity.

5. The probe of claim 1, wherein the portion of the forward path extending around said heating means is defined by a material having high thermal conductivity.

6. The probe of claim 1, wherein said cylindrical member leads to a series of apertures through which the working gas reverses its flow as it enters the return path.

7. The probe of claim 6, including a lateral bearing for providing side location for a spinning cylindrical sample-holder, the spacing between said series of apertures and said lateral bearing being such that said lateral bearing is comparatively unaffected by the temperature set up at the sample station.

8. The probe of claim 1, wherein said minicooler device is surrounded by a thermally insulating sleeve having discrete apertures through which the returning working gas enters before passing through substantially the whole of said heat exchanger means.

9. The probe of claim 1, including a cylindrical Dewar surrounding said minicooler device, said heating means and said cylindrical member and extending to a region beyond the means for reversing the flow of the working gas, the inner face of the Dewar representing the outer boundary of the return path.

10. The probe of claim 1, including a plug downstream of said heating means provided with longitudinal circumferential grooves which form part of the forward path, said plug defining the bottom boundary of said temperature-controlled sample station and accommodating an end bearing for end-wise support of a spinning sample-holder tube.

11. The probe of claim 1, wherein said minicooler device and said heating means are formed into a self-supporting unit for easy insertion into the probe.

12. The probe of claim 1, wherein said cylindrical member supports a receiving coil for picking up a gyromagnetic resonance signal.

* * * * *